F. W. HEDGELAND.
DIFFERENTIAL CLUTCH MECHANISM FOR AUTOMOBILES.
APPLICATION FILED MAY 18, 1907.
906,016.  Patented Dec. 8, 1908.
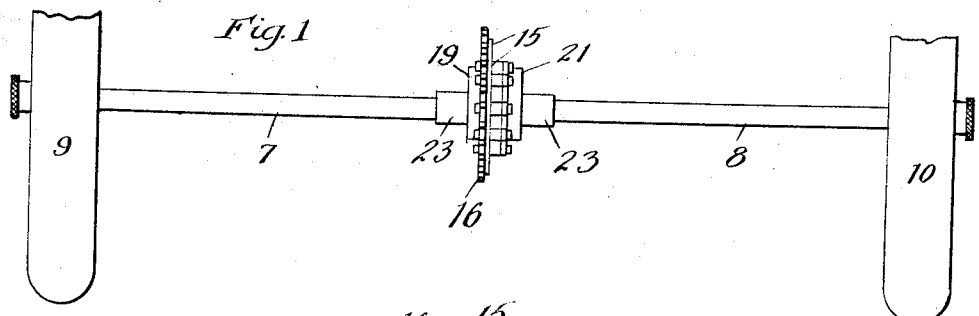
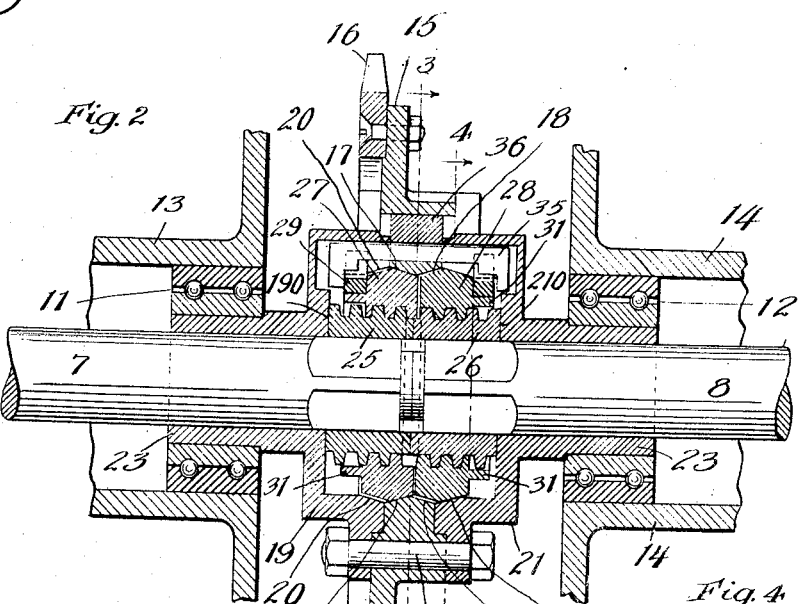
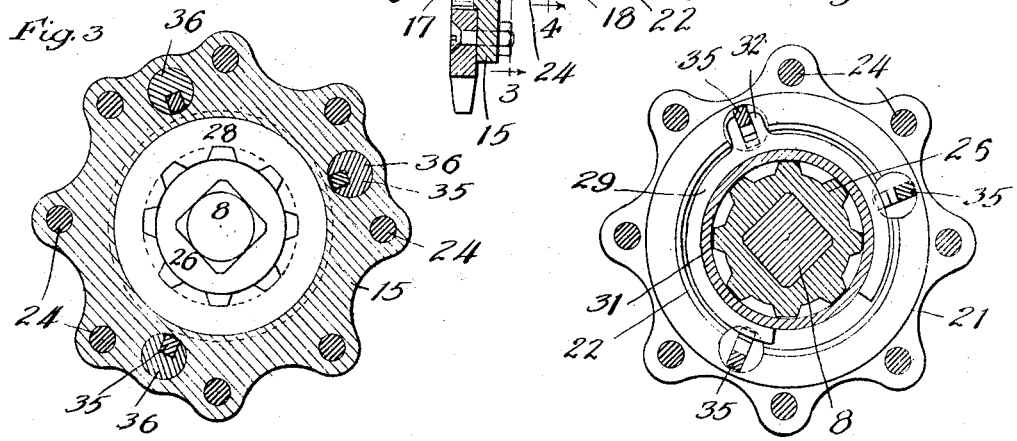
Witnesses:
Wm. Geiger
D. W. Munday
Inventor:
Frederick W. Hedgeland
By Munday, Evarts, Adcock & Clarke,
Attorneys

UNITED STATES PATENT OFFICE.

FREDERICK W. HEDGELAND, OF CHICAGO, ILLINOIS.

DIFFERENTIAL CLUTCH MECHANISM FOR AUTOMOBILES.

No. 906,016.  Specification of Letters Patent.  Patented Dec. 8, 1908.

Application filed May 18, 1907. Serial No. 374,490.

*To all whom it may concern:*

Be it known that I, FREDERICK W. HEDGE-LAND, a citizen of the United States, residing in Chicago, in the county of Cook and State of Illinois, have invented a new and useful Improvement in Differential Clutch Mechanism for Automobiles, of which the following is a specification.

This invention relates to the construction of the clutching mechanism employed for transmitting power from the motor to the driving wheels or axles of automobiles.

The mechanism of the invention is adapted to transmit like power to both axles or wheels, to permit either wheel to overrun when turning corners and to insure engagement of both clutches when both wheels overrun. The construction also permits the employment of the motor in braking or retarding the wheels whenever that may be necessary, and possesses great simplicity and strength and is easily applied to existing automobiles.

The nature of the invention is fully set forth below and illustrated in the accompanying drawings, in which—

Figure 1 is an elevation of the driving wheels and axles of an automobile to which my invention has been applied. Fig. 2 is an enlarged longitudinal section of the clutch mechanism; and Figs. 3 and 4 are sections on the lines 3—3 and 4—4, respectively, of Fig. 2.

In said drawings, 7 and 8 are the axles of the driving-wheels 9 and 10, each turning freely and independently. The inner ends of the axles to which the clutch mechanism is applied are rounded, as in Figs. 2 and 3 and are in abutting contact, as shown, and are supported in any suitable way—as, for instance, by the bearings 11 and 12 in the stationary parts 13 and 14 of the automobile.

The clutch mechanism is double, one part for each axle, and will now be described.

A ring 15, having sprocket-teeth 16 formed thereon or attached thereto, adapted to receive power from the motor of the machine, encircles the abutting ends of the two shafts and is provided with two interior inclined friction-surfaces 17 and 18, one for each clutch. At one side of the ring 15 is a cup-shaped member 19, having an interior inclined friction-surface 20, and at the other side of the ring is a similar cup-shaped member 21, having an interior inclined friction-surface 22. The surfaces 17 and 22 incline in one direction, and the surfaces 18 and 20 incline in the opposite direction. Both cup-shaped members are provided with sleeves 23, fitting the axles and inclosed by the bearings 11 and 12. The ring and the clutch members 19 and 21 form the non-shifting members of the clutches, and they are also the driving members thereof and are provided with exterior eyes adapted to receive the bolts 24, whereby they are secured together, so that they form substantially a barrel or drum adapted to hold oil and within which the moving parts of the clutch may be located.

The ends of the axles are squared for a short distance, as shown, and upon these square portions threaded screw-sections 25 and 26 are fitted, and confined against movement on the axles between the shoulders or faces 190 and 210 upon the inside of the cup members 19 and 21. Each screw section is independent of the other, and can turn with the shaft on which it is mounted. These screw sections are threaded in the same direction, preferably right hand, and they engage corresponding threads on the inside of the shifting members 27 and 28 of the clutch. These shifting members are also the driven members, and they are formed with oppositely inclined friction surfaces as plainly shown, so that the member 27 is adapted to contact with and take power from surfaces 17 and 20, and the member 28 is adapted to contact with and take power from surfaces 18 and 22, both members having a turning fit with their respective opposing surfaces so that they may be made to take power from either surface toward which they may be shifted by the screw sections. A vacant space is formed between the sections, as seen at Fig. 2, which is intended to prevent any locking contact between them.

Spanning the driven members 27 and 28, are a series of spanners 35, preferably three in number, mounted in round plug-like holders 36, let into the ring 15. The ends of these spanners extend toward the axis and outside of the tension rings 29 hereinafter mentioned, and confine said rings and also act as stops to the shifting movements of the driven members. The spanners preferably have freedom to move endwise in their holders. Upon the outer vertical face of each driven member is formed a laterally extending hub 31, and tension rings 29 are supported upon these hubs. In order that the rings may move around on the hubs with the driving member of the clutch, each of them is provided with outwardly standing ears 32 which together form a notch in which one of the spanners may be entered, as plainly shown in Fig. 4. Fig. 3 shows a section of the center ring 15 with three plugs or holders 36 inserted. These plugs form bearings for the stops or checks 35 and are used only to enable putting the stops in position after the shifting members are placed in their respective cups, and to hold the stops against displacement and form guides for them. To one of these stops are attached the tension members by means of a slot or rabbet as already described. This holds the tension rings from revolving with the shifting members. The tension rings and shifting clutch members 27 and 28 all travel together as a unit except when either clutch is differentiated. Then the hub on member 27 or 28 revolves in the tension ring 29.

The operation of the invention is as follows: Supposing the drawing to show the rear of the car, axle 7 being the left hand driving shaft and axle 8 the right hand driving shaft, and that both wheels are driving backward. In this case the friction surfaces 17 and 22 of the driving members are engaging the driven members 27 and 28. If a corner is now turned, shaft 7 for instance, would be the propelling shaft and the driven member 27 would retain the position shown, while shaft 8 would overrun and turn the member 28 until its side face touched the side face of member 27 when it would revolve without engaging either of the clutch faces 18 or 22. On the other hand, if the turn was in the opposite direction, shaft 8 would become the propelling shaft and clutch member 28 would remain in the position shown, while shaft 7 would overrun and its clutch member 27 be shifted until it encountered the spanners 35 and be arrested thereby. In this case, the clutch member which is acting, will act through the spanners to hold the member 27 which is shifting from engaging the friction surface of the driving member toward which it moves in the shifting, and leaves it free to turn with the overrunning shaft. In driving ahead the friction surfaces 18 and 20 are engaged, and if a turn to the left is made, shifting member 27 remains engaged, while shaft 8 overruns and its shifting member shifts from 18 toward 22 without however engaging the latter, being held between 18 and 22 by the spanners. If the turn is to the right, member 28 remains engaged, while member 27 shifts until it touches member 28 and thus is prevented from engaging either of its opposing friction surfaces 17 or 20. With my invention, each clutch releases whenever its shaft overruns, whether the motion is forward or back, and its shifting member assumes a neutral or non-acting position, but it reëngages as soon as the overrunning ceases. And in case both shafts overrun at the same time, as in going down hill, both clutches will engage so that it becomes possible to utilize the power of the motor to retard the machine. In all these operations the engaging and disengaging of the clutches is wholly automatic.

The screw sections 25 and 26, are desirably made separate from and fitted on the axles. Inasmuch, however, as they are confined against movement longitudinally of the axles, and cannot turn thereon, the screws may, if preferred, be cut in the metal of the axles themselves.

I claim:—

1. In differential clutch mechanism, the combination with independent shafts, of non-shifting driving clutch members, and shifting driven clutch members, the latter having threaded engagement with their respective shafts by means of threads running in the same direction, and tension devices acting on the shifting members and causing them to shift.

2. In differential clutch mechanism, the combination with abutting independent shafts, of non-shifting driving clutch members, and shifting driven clutch members, the latter having threaded engagement with their respective shafts by means of threads running in the same direction, and tension devices acting on the shifting members and causing them to shift.

3. In differential clutch mechanism, the combination with independent shafts, of non-shifting driving clutch members, and shifting driven clutch members, the latter having threaded engagement with their respective shafts by means of threads running in the same direction, and tension devices acting on the shifting members and causing them to shift, the shifting member of the clutch which does not differentiate controlling the shifting member of the clutch which does differentiate.

4. In differential clutch mechanism, the combination with independent shafts, of non-shifting driving clutch members, and shifting clutch members, the latter having threaded engagement with their respective shafts by means of threads running in the same direction, and tension devices acting on the shifting members and causing them to shift, stops being provided to arrest the shifting movements of any shifting member which overruns.

5. In differential clutch mechanism, the combination with independent shafts, of non-shifting driving clutch members, and shifting driven clutch members, the latter having threaded engagement with their respective shafts by means of threads running in the same direction, and tension devices acting on the shifting members and causing them to shift, the shifting member of the clutch which does not differentiate, arresting the shifting movement of the shifting member of the clutch which does differentiate.

6. The combination in differential clutch mechanism, of the shafts, driving members, shifting driven members, and means for causing the shifting, each shifting member being adapted to arrest the shifting of the other shifting member.

7. The combination in differential clutch mechanism, of the shafts, driving members, shifting driven members, means for causing the shifting and stop devices arresting the shifting movements in outward directions, each shifting member being adapted to arrest the inward shifting movements of the other shifting member.

8. In differential clutch mechanism, the combination with independent shafts, of non-shifting driving clutch members, and shifting driven clutch members, the latter having threaded engagements with their respective shafts by means of threads running in the same direction, means for limiting the shifting movement of either shifting member which may overrun, and means for causing the shifting movement.

9. In differential clutch mechanism, the combination with independent shafts, of non-shifting driving clutch members, and shifting driven clutch members, the latter having threaded engagement with their respective shafts by means of threads running in the same direction, spanners 35 for limiting the shifting movement of either shifting member which may overrun, and means for causing the shifting movement.

10. The combination in differential clutch mechanism, of the shafts, driving members, shifting driven members, means for causing the shifting, and spanners supported in the driving members and acting as stops to the shifting movements.

11. The combination in differential clutch mechanism, of the shafts, driving members, shifting driven members, means for causing the shifting carried by the driving members, and spanners supported by the driving members and acting as stops to the shifting movements.

12. The differential clutch mechanism wherein are combined independent shafts, shifting driven clutch members threaded on the shafts, the threads of both running in the same direction, driving clutch members surrounding the driven members and having friction surfaces opposing those of the driven members, tension devices for each shifting member attached to the driving members, and stop devices for arresting the overrunning of the shifting members.

13. The differential clutch mechanism wherein are combined independent shafts, shifting driven clutch members mounted on the abutting ends of the shafts, threaded screw sections immovably secured on the shafts and engaging interior threads of said shifting members, the threads of both sections running in the same direction, driving clutch members surrounding the driven members and having friction surfaces opposing those of the driven members, tension devices for each shifting member attached to the driving members, and stop devices for arresting the overrunning of the shifting members.

14. In differential clutch mechanism, the combination of independent abutting axles, having their abutting ends provided with threads running in the same direction, driven clutch members mounted on said threaded ends and adapted to shift thereon, driving members having friction surfaces opposing those of the driven members and means whereby the driven members may be caused to shift upon said threads.

FREDERICK W. HEDGELAND.

Witnesses:
H. M. MUNDAY,
EDW. S. EVARTS.